(12) United States Patent
Kohn et al.

(10) Patent No.: US 9,065,724 B2
(45) Date of Patent: *Jun. 23, 2015

(54) MANAGING A FLOW TABLE

(75) Inventors: Jack Kohn, Mountain View, CA (US);
David Rowell, Mountain View, CA (US); Fuguang Shi, Saratoga, CA (US);
Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 469 days.

This patent is subject to a terminal disclaimer.

(21) Appl. No.: 13/615,954

(22) Filed: Sep. 14, 2012

(65) Prior Publication Data
US 2013/0013598 A1    Jan. 10, 2013

Related U.S. Application Data

(63) Continuation of application No. 12/363,285, filed on Jan. 30, 2009, now Pat. No. 8,300,525.

(51) Int. Cl.
*H04L 12/26*    (2006.01)

(52) U.S. Cl.
CPC ............ *H04L 43/026* (2013.01); *H04L 43/022* (2013.01); *H04L 43/16* (2013.01)

(58) Field of Classification Search
CPC ...... H04L 43/026; H04L 43/022; H04L 43/16
USPC .................................. 370/252, 230, 229, 253
See application file for complete search history.

(56) References Cited

U.S. PATENT DOCUMENTS

| | | | |
|---|---|---|---|
| 5,038,347 A | 8/1991 | Courtois | |
| 7,738,465 B2 | 6/2010 | Akahane et al. | |
| 8,300,525 B1 | 10/2012 | Kohn et al. | |
| 2007/0271374 A1* | 11/2007 | Shomura et al. | 709/224 |
| 2008/0267184 A1 | 10/2008 | Arisoylu et al. | |
| 2010/0142524 A1 | 6/2010 | Garofalo et al. | |

OTHER PUBLICATIONS

Co-pending U.S. Appl. No. 12/363,285, filed Jan. 30, 2009, to Jack Kohn et al., entitled "Managing a Flow Table", 37 pages.

* cited by examiner

*Primary Examiner* — Candal Elpenord
*Assistant Examiner* — Syed M Bokhari
(74) *Attorney, Agent, or Firm* — Harrity & Harrity, LLP

(57) ABSTRACT

A device may include a flow table to store, in flow table records, statistics associated with a number of data flows, and a flow type table to store, in flow type table records, information that indicates whether to store statistics in the flow table for each of a number of types of data flows, information that indicates a manner for sampling data units associated with the data flows, and/or information that indicates when to delete flow table records from the flow table.

20 Claims, 7 Drawing Sheets

Fig. 5A

| FLOW TYPE ID | MASK | AGE | SAMPLE |
|---|---|---|---|
| 510 | 520 | 530 | 540 |
| ... | ... | ... | ... |

| FLOW ID | SOURCE IP ADDRESS | DESTINATION IP ADDRESS | SOURCE PORT | DESTINATION PORT | PROTOCOL | DATA UNIT/ BYTE COUNT | TIMING | FLOW TYPE ID |
|---|---|---|---|---|---|---|---|---|
| 515 | 525 | 535 | 545 | 555 | 565 | 575 | 585 | 595 |
| ... | ... | ... | ... | | | | | |

460

MANAGING A FLOW TABLE

RELATED APPLICATION

This application is a continuation of U.S. patent application Ser. No. 12/363,285, filed Jan. 30, 2009, which is incorporated herein by reference.

BACKGROUND

As network security and visibility of data flows becomes increasingly important, the need to monitor data flows within a network device has increased. Typically, in order to monitor information related to data flows within a network device, such as a switch or router, each time a data packet associated with a data flow is received, a record in a flow table is created. As the amount of data flows that may be transmitted through network devices is quite substantial, the flow tables stored in the network devices commonly grow too large to be efficiently accessed.

SUMMARY

According to one implementation, a device may include a flow table to store, in a number of flow table records, statistics associated with a number of data flows; a flow type table to store, in a number of flow type table records, information that indicates whether to store statistics in the flow table for each of a number of types of data flows; logic to receive a data unit associated with a data flow; logic to determine a type of the data flow; logic to access the flow type table, based on the determined type of the data flow, to determine whether to store statistics associated with the data flow in the flow table; logic to store the statistics associated with the data flow in the flow table when the information in the flow type table indicates that statistics for the determined type of the data flow are to be stored in the flow table; and logic to process the data unit without storing the statistics associated with the data flow in the flow table when the information in the flow type table indicates that statistics for the determined type of the data are not to be stored in the flow table.

According to yet another implementation, a method, performed by a device, may include storing flow table records in a first memory of the device, where each of the flow table records corresponds to a particular data flow, and where each of the flow table records includes a count value; storing flow type table records in a second memory of the device, where each of the flow type table records corresponds to a particular type of data flow, and where each of the flow type table records includes a particular value; setting the count value, of one of the flow table records, to the particular value; decrementing the count value, of the one of the flow table records, for each time interval during which no data unit is received for the particular data flow corresponding to the one of the flow table records; determining whether the count value, of the one of the flow table records, equals zero; and deleting the one of the flow table records when the count value equals zero.

According to a further implementation, a device may include means for storing a number of flow table records in a flow table, where each of the flow table records includes statistics associated with a data flow; means for storing a number of flow type table records in a flow type table, where each of the flow type table records includes information that indicates a manner of sampling data units for a type of data flow; means for receiving a data unit associated with a data flow; means for determining a type of the data flow; means for accessing the flow type table, based on the determined type of the data flow, to determine a manner of sampling the data flow; and means for sampling the data flow based on the determined manner of sampling.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIG. 5A is a diagram of exemplary fields of the flow type table of FIG. 4;

FIG. 5B is a diagram of exemplary fields of the flow table of FIG. 4;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Implementations described herein, may use information regarding a type of data flow to determine how to process data units associated with the data flow. For example, in one implementation, information, regarding a type of data flow may be used to determine whether to store information associated with the data units associated with the data flow, in a flow table. In another implementation, information regarding a type of data flow may be used to determine when to delete information associated the data flow from the flow table. In yet another implementation, information regarding a type of data flow may be used to determine the manner in which the data units in the data flow are sampled. The term "data unit," as used herein, may refer to a packet, a data gram, or a cell included in a data flow; a fragment of a packet, a data gram or a cell; or another type or arrangement of data included in a data flow. The term "data flow," as used herein, may refer to a specific connection between a source and a destination.

Exemplary Network Configuration

Figure 1:
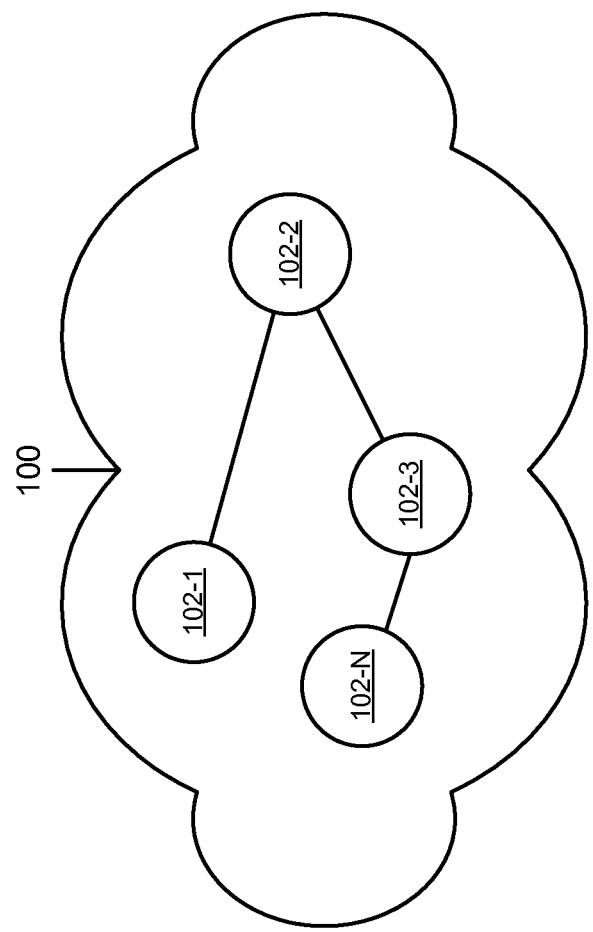
FIG. 1 is a diagram of an exemplary network in which systems and methods, described herein, may be implemented.

FIG. 1 is a diagram of an exemplary network 100 in which systems and methods, described herein, may be implemented. Network 100 may include any type of network, such as the Internet, an ad hoc network, a local area network (LAN), a wide area network (WAN), a metropolitan area network (MAN), a telephone network (e.g., a wireless communication network or the public switched telephone network (PST)), or a combination of networks.

As shown, network 100 may include N network devices 102-1 through 102-N (collectively referred to herein as "network devices 102," or individually as "network device 102") (N≥1). Each of network devices 102-1 through 102-N may include a switch, a router, a server, or another type of device. While network devices 102-1 through 102-N can be implemented as different types of devices, in the following paragraphs, network devices 102-1 through 102-N will be described in terms of a router. The links interconnecting network devices 102-1 through 102-N are shown by way of example. Network devices 102-1 through 102-N may be interconnected via different links than those shown in FIG. 1.

Exemplary Components of Network Device

Figure 2:
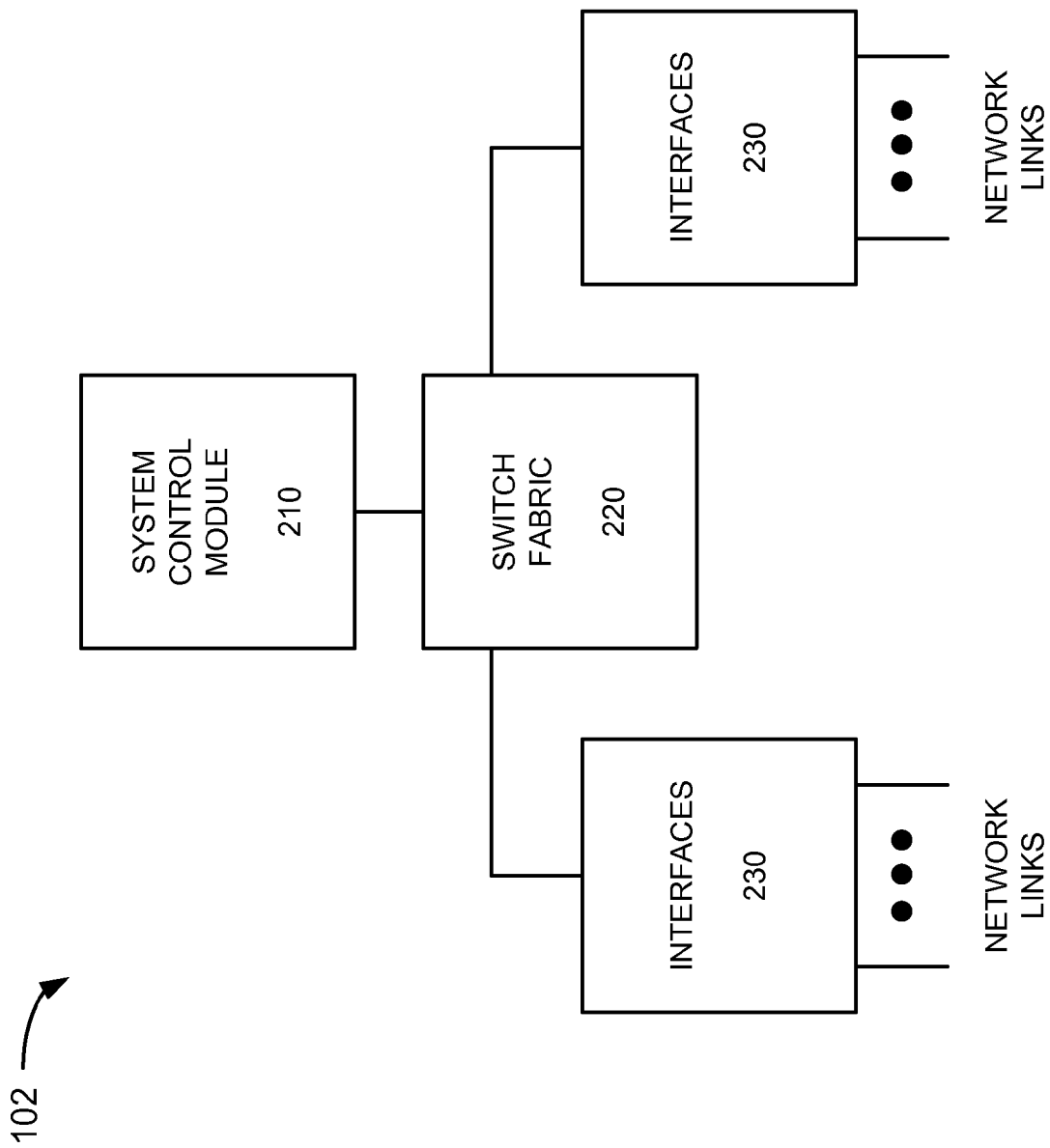
FIG. 2 is a block diagram illustrating exemplary components of a network device of FIG. 1.

FIG. 2 is a block diagram illustrating exemplary components of network device 102. As shown in FIG. 2, network device 102 may include a system control module 210, a switch fabric 220, and a group of interfaces 230. In other implementations, network device 102 may include fewer, additional, different, or differently arranged components than those illustrated in FIG. 2.

System control module 210 may include one or more processors, microprocessors, application specific integrated circuits (ASICs), field programming gate arrays (FPGAs), and/or processing logic that may be optimized for networking and communications. System control module 210 may perform high level management functions for network device 102. For example, system control module 210 may communicate with other networks and systems connected to network device 102 to exchange information regarding network topology. In some implementations, system control module 210 may include a routing engine for creating routing tables based on network topology information, creating forwarding tables based on the routing tables, and sending these tables to interfaces 230 for data unit routing. System control module 210 may also include a static memory (e.g. Ea read only memory (ROM)), a dynamic memory (e.g. Ea random access memory (RAM)), onboard cache, and/or flash memory for storing data and/or machine-readable instructions.

Switch fabric 220 may include one or more switching planes to facilitate communication among interfaces 230 and/or system control module 210. In one implementation, each of the switching planes may include a single or multi-stage switch of cross bar elements. Switch fabric 220 may also, or alternatively, include processors, memories, and/or paths that permit communication among system control module 210 and interfaces 230.

Interfaces 230 may include devices or assemblies, such as line cards, for receiving incoming data units from network links (or from other interfaces 230) and for transmitting the data units to network links (or to other interfaces 230). For example, interfaces 230 may include Ethernet interfaces, optical carrier (OC) interfaces, and/or asynchronous transfer mode (ATOM) interfaces. Interfaces 230 may manage a set of input ports via which data units can be received and a set of output ports via which data units can be transmitted.

Depending on the implementation, the components that are shown in FIG. 2 may provide fewer or additional functionalities. For example, if network device 102 performs an Internet Protocol (IP) data unit routing function as part of a Multi-Protocol Label Switching (MPLS) router, system control module 210 may perform tasks associated with obtaining routing information from other routers in a MPLS network. In such cases, conveying network traffic from one interface to another may involve label-based routing, rather than IP address-based routing.

Figure 3:
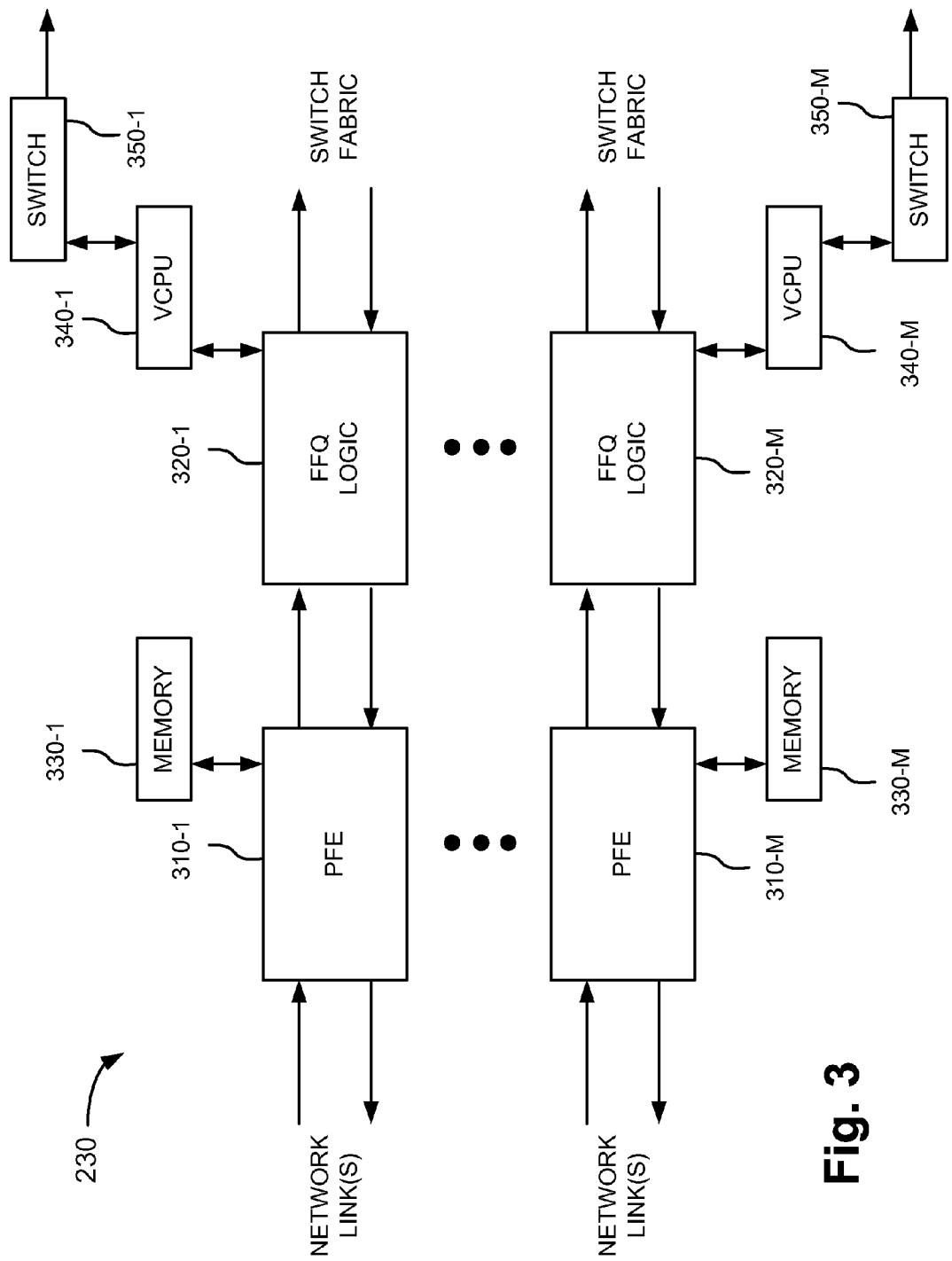
FIG. 3 is a block diagram illustrating exemplary components of an interface of FIG. 2.

FIG. 3 is a block diagram illustrating exemplary components of interface 230. As shown in FIG. 3, interface 230 may include one or more packet forwarding engines (PFEs) 310-1, . . . , 310-M (collectively referred to herein as "PFEs 310," or individually as "PFE 310") (M≥1), one or more flow management and fabric queuing (FFQ) logic 320-1, . . . , 320-M (collectively, and individually, referred to herein as "FFQ logic 320"), one or more memories 330-1, . . . , 330-M (collectively referred to herein as "memories 330," or individually as "memory 330") (M≥1), one or more Visibility Central Processing Units (VCPUs) 340-1, . . . , 340-M (collectively referred to herein as "VCPUs 340", or individually as "VCPU 340"), and one or more switches 350-1, . . . , 350-M (collectively referred to herein as "switches 350," or individually as "switch 350") (M≥1). In other implementations, interface 230 may include fewer, additional, different, or differently arranged components than those illustrated in FIG. 3.

PFEs 310 may each include hardware, or a combination of hardware and software, that may receive, store, process, and/or forward data units. For example, PFEs 310 may process data units received from incoming network links and prepare data units for transmission on outgoing network links PFEs 310 may make forwarding decisions based on header information of the data units. PFEs 310 may each include a memory to aid in the storing, processing, and/or forwarding of received data units. PFE 310 may also access memory 330 to receive information regarding further processing of received data units. For example, PFE 310 may use information included in a data unit header, such as an IP address, port information, protocol information, etc., to create a look-up key. PFE 310 may receive information from memory 330 based on the look-up key, in order to further process data units. PFE 310 may forward received data units and information received from memory 330 to FFQ logic 320.

Memory 330 may include one or more memories for storing flow processing rules and flow type information. Memory 330 may receive information or an address from PFE 310 and may transmit (back to PFE 310) stored rules and stored flow type information, such as a flow type identifier, hereinafter referred to as a "flow type ID." For example, memory 330 may store a number of flow type IDs, where a flow type ID identifies one of a number of different types of data flows. For example, there may be 16 or 32 different types of data flows, where each type of data flow has a corresponding flow type ID. In one example, memory 330 may be configured as a Ternary Content Addressable Memory (TCAM), where information transmitted from PFE 310 to memory 330 may be referred to as a "look-up key." For example, memory 330 may receive a look-up key from PFE 310, and use this information as an address to look up data unit and flow processing rules and a flow type ID stored within memory 330. The flow processing rules and flow type ID may be transmitted from memory 330 to PFE 310 for further processing of a data unit by PFE 310 and FFQ logic 320. Additionally, memory 330 may include logic to store and return a null record (no information) to PFE 310 for particular look-up keys. For example, memory 330 may not store a flow type ID for every possible look-up key that may be received from PFE 310. As described below, information stored and transmitted from memory 330 may be used to determine which flows are to be added (or masked) from a flow table in FFQ logic 320.

Figure 4:
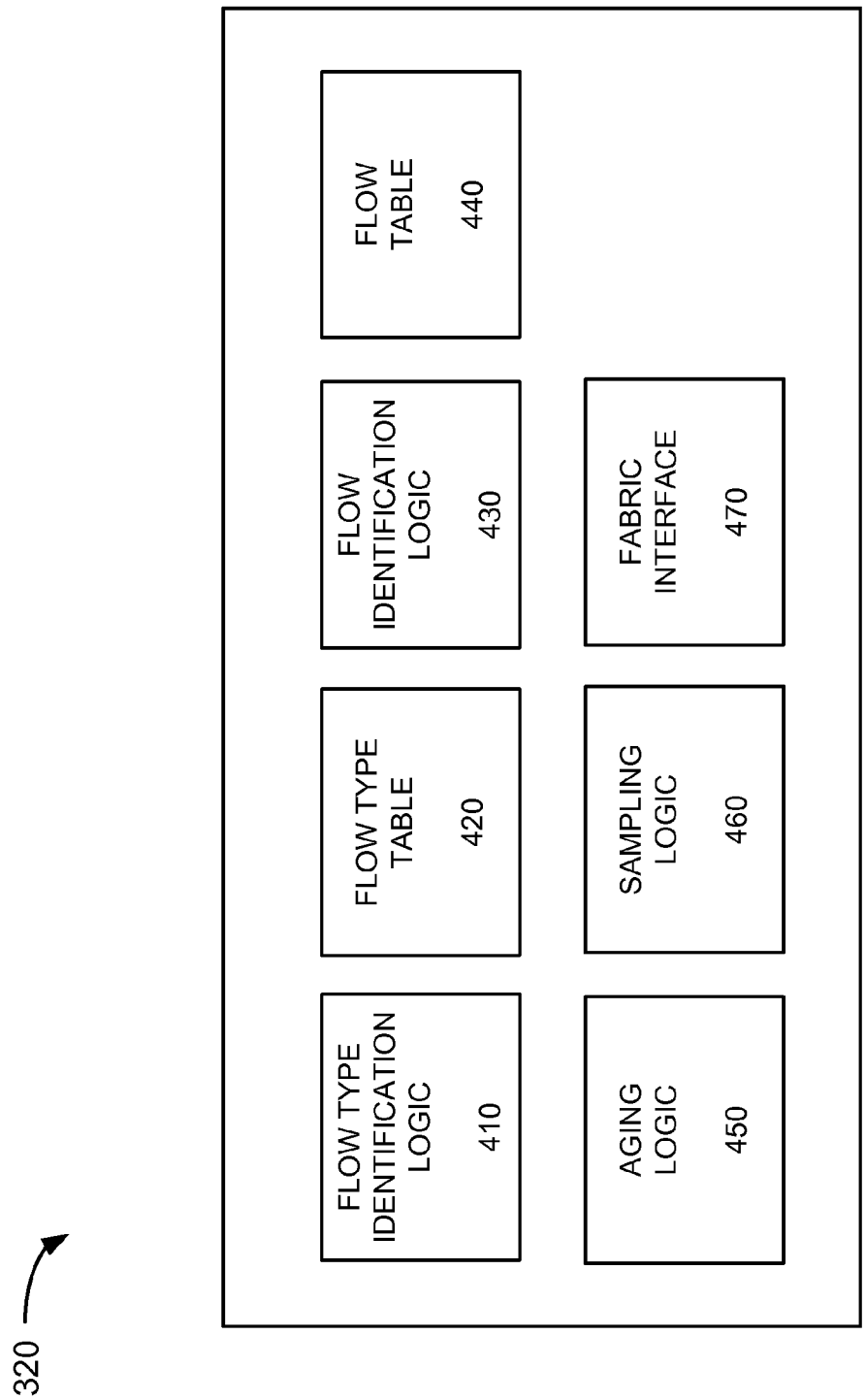
FIG. 4 is a block diagram illustrating exemplary functional components of flow management and fabric queuing logic of FIG. 3.

FFQ logic 320 may include hardware, or a combination of hardware and software, that may receive data units from PFEs 310 and dynamically process data units. For example, FFQ logic 320 may include a flow table with information relating to data flows, such as, addresses, ports, protocols, and statistics associated with data unit flows. In one implementation, FFQ logic 320 may monitor and update records within the flow table. FFQ logic 320 may also include a flow type table which may store information related to managing and processing flow records within the flow table. Using information stored in a flow type table, for example, FFQ logic 320 may determine sampling associated with a flow, may determine when to delete a flow record from the flow table based on the age of the record and may determine whether to include a flow in the flow table, i.e., mask the flow from the flow table. For example, FFQ logic 320 may receive a flow type ID associated with a data unit from PFE 310. FFQ logic 320 may use the received flow type ID to manage and/or update a record in the flow table. In still further examples, when FFQ logic 320 does not receive a flow type ID from PFE 310, FFQ logic 320 may be configured to automatically add information related to the associated flow in the flow table, or FFQ logic 320 may be configured to not add information associated with the flow to the flow table. Details of components within FFQ logic 320 are shown in FIG. 4.

Visibility Central Processing Unit (VCPU) 340 may include one or more processors, microprocessors, application specific integrated circuits (ASICs), field programming gate arrays (FPGAs), and/or processing logic for performing network communications, management and analysis functions. For example, VCPU 340 may control functions related to (local) operations between components shown in FIG. 3 and may control functions related to "visibility" of data units transmitted though interface 230 (as shown in FIG. 3). For example, VCPU 340 may include hardware and/or software for managing flow table records and sampling data units. For example, VCPU 340 may receive a flow table record from FFQ logic 320. VCPU 340 may also transmit flow table records and sampled data units to an external device via switch 350.

For example, in managing flow records, VCPU 340 may receive flow table records and statistics from FFQ logic 320, aggregate and/or maintain the received flow table records and statistics in a shadow table, and export the aggregated flow table records and/or statistics to another device within network device 102, or alternatively, to a network device that is external to network device 102. VCPU 340 may aggregate flow table records and/or statistics based on various parameters, such as a communication protocol, a port number, source and/or destination addresses, a source/destination address prefix, a source/destination autonomous system (AS) prefix, etc.

Switch 350 may include a switch that may transmit/receive data units and/or information to/from VCPU 340. Switch 350 may also transmit and/or receive data units and/or information over an out-of-band plane, via switch fabric to another device (internal or external to network device 102) for further processing and/or analysis. In one implementation, switch 350 may take the form of an Ethernet switch.

Exemplary Functional Components of FFQ Logic

FIG. 4 is a block diagram illustrating exemplary functional components of FFQ logic 320. As shown in FIG. 4, FFQ logic 320 may include flow type identification logic 410, a flow type table 420, flow identification logic 430, a flow table 440, aging logic 450, sampling logic 460 and a fabric interface 470. In another implementation, FFQ logic 320 may include fewer, additional, different, or differently arranged components than those illustrated in FIG. 4. For example, in some implementations, one or more of the functional components of FIG. 4 may be located external to FFQ logic 320. Also, or alternatively, one of more of the functions described as performed by one of the functional components may be performed by another one of the functional components.

Flow type identification logic 410 may include hardware, or hardware in combination with software, that may receive and process a flow type ID from PFE 310. Flow type identification logic 410 may, upon identification of the flow type ID associated with a data unit, determine whether to process (and/or create) a flow record in flow table 440. For example, flow type identification logic 410 may use the received flow type ID as an index into flow type table 420 and determine how to process a corresponding record in flow table 440. As described below, for example, flow type identification logic 410 may access information in flow type table 420 to determine whether to add information into flow table 440, may determine how to sample a data flow and may determine when to delete a record from flow table 440.

Flow type table 420 may be implemented within a memory device, such as one or more dynamic RAMs (DRAMs). Flow type table 420 may include a number of records corresponding to data flow types identified by PFE 310. For example, each record in flow type table 420 may include, for a particular data flow type, information for processing a flow record, in flow table 440, that corresponds to a data flow of the particular data flow type. For example, information in a record in flow type table 420 may be used to determine whether to mask a record from flow table 440, may be used to determine when to delete a record in flow table 440, and/or may be used to determine a manner of sampling a data flow.

FIG. 5A is a diagram of exemplary fields within a record in flow type table 420. As shown, flow type table 420 may include a number of flow table records. Each flow table record may include a flow type ID field 510, a mask field 520, an age field 530 and a sample field 540. In another implementation, flow type table 420 may include more, fewer, or different fields than the fields shown in FIG. 5A. For example, flow type ID field 510 may not be an actual field within flow type table 420, but, rather, may represent an address of a record within flow type table 420.

Flow type ID field 510 may contain information for identifying a flow type or may be used as an index into flow type table 420. Flow type ID field 510 may include a unique, or a substantially unique, flow type ID associated with a particular data flow type. As described above, for example, a flow type ID may be stored in memory 330 and forwarded from PFE 310 along with a data unit corresponding to the data flow. Upon receiving a flow type ID, associated information stored in fields 520-540 may be used to further process a flow record within flow table 440. Mask field 520 may contain information for indicating if a flow record should be added or masked from flow table 440. For example, mask field 520 may store information indicating to mask (not update or create) a record in flow table 440 or may store information indicating to update or create a record in flow table 440. Age field 530 may contain information relating to a particular value or a threshold time period that may be used to determine if a record in flow table 440 is a candidate for deletion from flow table 440. Sample field 540 may contain information for indicating if data units, pertaining to a data flow in flow table 440, are to be sampled and/or a type or manner of data unit sampling.

Returning to FIG. 4, flow identification logic 430 may include hardware, or hardware in combination with software, that may create and process a flow identifier, hereinafter referred to as a "flow ID," for a data unit, from PFE 310, to identify the associated data flow. For example, flow identification logic 430 may use information included in a data unit header, such as an IP address, port information, protocol information, etc., to create the flow ID. In one implementation, flow identification logic 430 may perform a hash function over the data unit header information to generate the flow ID. In another implementation, PFE 310 may generate the flow ID and send the flow ID, with the data unit, to FFQ logic 320.

Upon identification of the flow ID associated with a data unit, flow identification logic 430 may determine if a record corresponding to the flow ID has been previously created in flow table 440. For example, flow identification logic 430 may determine whether a record exists, in flow table 440, at an address corresponding to the flow ID or whether a record exists that contains a matching flow ID. If no record exists, a corresponding record may be made in flow table 440. If, however, a corresponding record had been previously created in flow table 440 (i.e., at least one prior data unit belonging to the data flow had been previously received by network device 102), flow identification logic 430 may update one or more fields, such as address and port information, a count value associated with reception of the data unit, data unit or byte count, etc., in the corresponding record to reflect the newly received data unit.

Flow table 440 may be implemented within a memory device, such as one or more dynamic RAMs (DRAMs). Flow table 440 may include a number of records corresponding to a number of different data flows. For example, each record in flow table 440 may include information corresponding to a data flow, such as address information, port or interface information, protocol, etc. Flow table 440 may include information regarding a large number of data flows, such as over one million data flows.

FIG. 5B is a diagram of exemplary fields within a record in flow table 440. As shown, flow table 440 may include a number of flow table records. Each flow table record may include a flow ID field 515, a source IP address field 525, a destination IP address field 535, a source port field 545, a destination port field 555, a protocol field 565, a data unit/byte count field 575, a timing field 585 and a flow type ID field 595. In another implementation, flow table 440 may include more, fewer, or different fields than the fields shown in FIG. 5B. For example, flow ID field 515 may not be an actual field within flow table 440, but, rather, may represent an address of a record within flow table 440.

Flow ID field 515 may contain information for identifying a flow or for indicating a location of the flow record within flow table 440. Flow ID field 515 may include a unique, or a substantially unique, flow ID associated with a particular data flow. As described above for example, a flow ID may be created from information in a header of a data unit corresponding to the data flow. Upon creating a flow ID, other information related to the flow may be updated within flow table 440. The flow ID may provide an efficient way to identify and locate data flow records in flow table 440. Source IP address field 525 may contain information for indicating a source IP address from which the flow of data units originates. Destination IP address field 535 may contain information for indicating a destination IP address for the flow of data units. Source port field 545 may contain information for identifying a transmission control protocol (TCP) or a user data gram protocol (UDP) source port number, for example. Destination port field 555 may contain information for indicating a destination port (e.g., port 83 for web server) for the flow of data units. Protocol field 565 may contain information for indicating a protocol of a data unit. Data unit/byte count field 575 may contain information for accumulating and/or indicating the number of data units and/or bytes that have been transferred by the flow.

Timing field 585 may contain information that may be used to determine if a record in flow table 440 is considered as a candidate for deletion from flow table 440. In one implementation, timing field 585 may store a count value that is initially set to a particular value, decremented every time interval in which no data unit is received in the data flow, and reset to the particular value each time interval in which a data unit is received in the data flow. The particular value may be obtained from age field 530 in flow type table 420. In another implementation, timing field 530 may store a time stamp value that indicates a time when a last data unit was received in the data flow or a time when the record was last updated. Flow type ID field 595 may include information related to the flow type ID, as described above.

Returning to FIG. 4, aging logic 450 may include hardware, or hardware in combination with software, that may perform one or more maintenance or "aging" functions on a record stored in flow table 440. In one implementation, aging logic 450 may use the count value in timing field 585 to determine whether to remove a record, corresponding to a particular data flow, from flow table 440. For example, aging logic 450 may delete a record when the record's timing field 585 has a count value of zero (i.e., no data unit was received in the data flow during the time period when the count value decremented from the particular value to zero). In another implementation, aging logic 450 may use the threshold time information in age field 530 to determine whether to remove a record, corresponding to a particular data flow, from flow table 440. For example, aging logic 450 may determine the time difference between a current time and the time value stored in a timing field 585 in flow table 440 to determine an age of the record in flow table 440. Aging logic 450 may then compare the determined age of the record to the threshold time information in age field 530 of flow type table 420. If the age of the record exceeds the threshold time period, the record may be deleted from flow table 440. When the determined age of the record does not exceed the threshold amount of time, aging logic 450 may determine that the record is not to be deleted. As a result, the time period used to "age out" different types of data flows from flow table 440 may differ based on different particular values or threshold time periods stored in flow type table 420 for the different types of data flows. In one implementation, removal of a record may simply correspond to making the record available to store information from a new data flow.

Sampling logic 460 may include hardware, or hardware in combination with software, that may perform one or more sampling functions on an identified flow of data units. In one implementation, sampling logic 460 may receive information from field 540 in flow type table 420, and determine a type of data unit sampling. For example, sampling logic 460 may sample only the first N data units of a data flow or may sample all the data units in a data flow, based on the information stored in field 540. Sampling logic 460 may also determine from information included in sample field 540 to not sample data units associated with a data flow. Sampling logic 460 may also include logic to route sampled data units to VCPU 340 for transmission to switch 350 (or may send sampled data units directly to switch 350), so that sampled data units may be analyzed by system control module 210 or analyzed by a device located external to network device 102.

Fabric interface 470 may include hardware, or a combination of hardware and software, that may provide an interface to PFE 310 and/or switch fabric 220. Fabric interface 470 may include one or more interfacing queues or buffers (not shown) for temporarily storing data units that await transmission from FFQ logic 320. In one implementation, fabric interface 470 may include a separate queue for each output port. Additionally, or alternatively, fabric interface 470 may include separate queues for different priority levels that may be assigned to the data units. Thus, fabric interface 470 may include separate queues per port and per priority. In other implementations, fabric interface 470 may include some other arrangement of queues. Fabric interface 470 may also include an arbiter that selects data units for transmission from the queues. In one implementation, the arbiter may use a fair selection technique based on data unit priority and/or output port availability. For example, the arbiter may select the highest priority data unit destined for an output port that is available to receive the data unit.

Exemplary Processes

Figure 6:
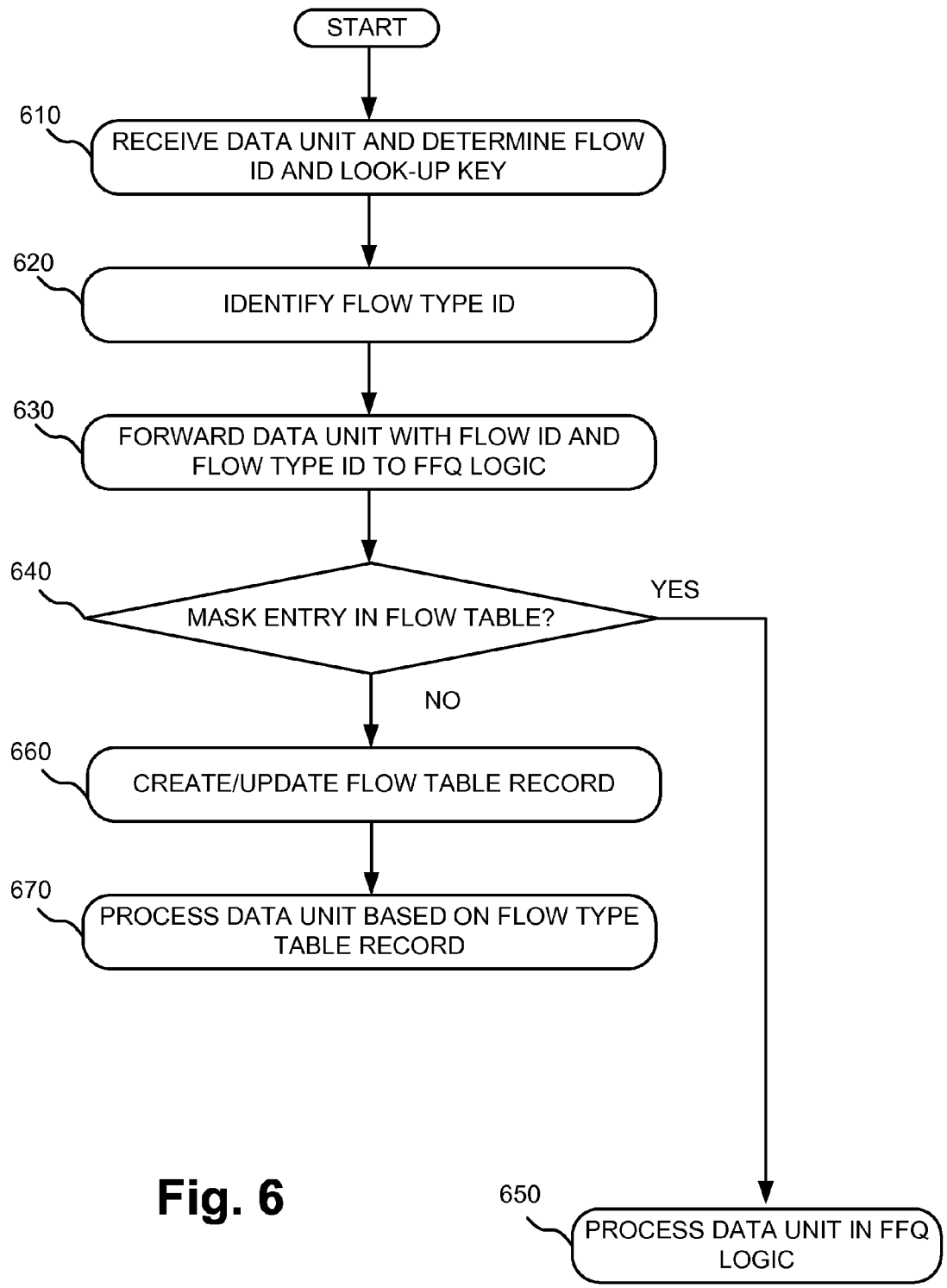
FIG. 6 illustrates a flowchart of an exemplary process for managing records in the flow table of FIG. 4.

FIG. 6 shows an exemplary flow table managing process 600. Process 600 may begin when a data unit is received and a look-up key is determined (block 610). For example, a data unit may be received by PFE 310 on a network link, as shown in FIG. 3. As described above, PFE 310 may use information received in the data unit header to form a look-up key to be transmitted to memory 330 (block 610). PFE 310 may then transmit the look-up key to memory 330 to identify or determine a flow type ID for the received data unit (block 620). For example, memory 330 may receive a look-up key and output a flow type ID to PFE 310 based on the received look-up key (block 620).

After PFE 310 receives a flow type ID from memory 330, the data unit with the associated flow type ID may be transmitted to FFQ logic 320 (block 630). FFQ logic 320 may determine if information associated with the data unit should be masked from the flow table 440 (block 640). As described above, for example, flow type identification logic 410 may access flow type table 420 and determine how to process a data flow based on the received flow type ID. Information, associated with the received flow type ID, such as information stored in mask field 520, may indicate whether to mask the associated flow from flow table 440 (block 640).

In the situation where memory 330 does not output a flow type ID based on a received look-up key from PFE 310 (in block 620), the data unit may be forwarded from PFE 310 to FFQ logic 320 without including a flow type ID (block 630). When a data unit is received by FFQ logic 320 without an associated flow type ID, FFQ logic 320 may determine that the flow is to be masked (not included) from flow table 440 (Yes—in block 640). Continuing with this example, the data unit may then be processed by FFQ logic 320 (block 650) without updating or creating a record in flow table 440.

Alternatively, when a data unit is received by FFQ logic 320 without an associated flow type ID, FFQ logic 320 may assign a default flow type ID and process the data unit based on the default flow type ID. For example, flow type identification logic 410 may access flow type table 420 to determine how to process a data flow based on the default flow type ID. Information, associated with the default flow type ID, such as information stored in mask field 520, may indicate whether to mask the associated flow from flow table 440 (block 640).

When information in mask field 520 indicates that the record should be masked (Yes—in block 640), the data unit may be processed by FFQ logic 320 (block 650). For example, FFQ logic 320 may prepare and forward the data unit to switch fabric for transmission to another network device 102 (block 650), without creating or updating a record within flow table 440.

When information in mask field 520 indicates that a record associated with the flow type ID should not be masked from flow table 440 (No—in block 640), a flow table record may be created or updated (block 660). Continuing with this example, FFQ logic 320 may generate a flow ID based, for example, on information in the header of the data unit. Using this flow ID, FFQ logic 320 may access flow table 440 and create or update the record (block 660). For example, flow identification logic 430 may use the flow ID to determine whether flow table 440 has a corresponding record. If, for example, flow table 440 includes a corresponding record, statistics from the flow may be updated (block 660). For example, flow identification logic 430 may count the number of data units/bytes in the data flow and may update the data units/byte count field 575 (as shown in FIG. 5B) accordingly. Flow identification logic 430 may also reset the count value in timing field 585 to the particular value from age field 530 of flow type table 420.

If, for example, flow table 440 does not include a corresponding record, a new record in flow table 440 may be formed. For example, the flow ID (and associated fields 525-595, as shown in FIG. 5B) may be added to flow table 440 (block 660). In this manner, flows of data units may be identified, stored and monitored by FFQ logic 320.

The data unit may be processed in accordance with the record in the flow type table 420 (block 670). For example, the value in sample field 540 may indicate that data units are to be sampled. As described above, a number of different sampling techniques may be employed by sampling logic 460. For example, a value in sample field 540 may indicate to sampling logic 460 to sample the first N data units of a data flow by sampling the received data units and sending copies to switch 350. In other examples, different values in sample field 540 may indicate to sample all data units within a data flow, to randomly sample data units within a data flow, or not to sample data units within the data flow (block 670).

As a result, data units associated with one type of data flow may be processed differently from data units associated with another type of data flow.

Figure 7:
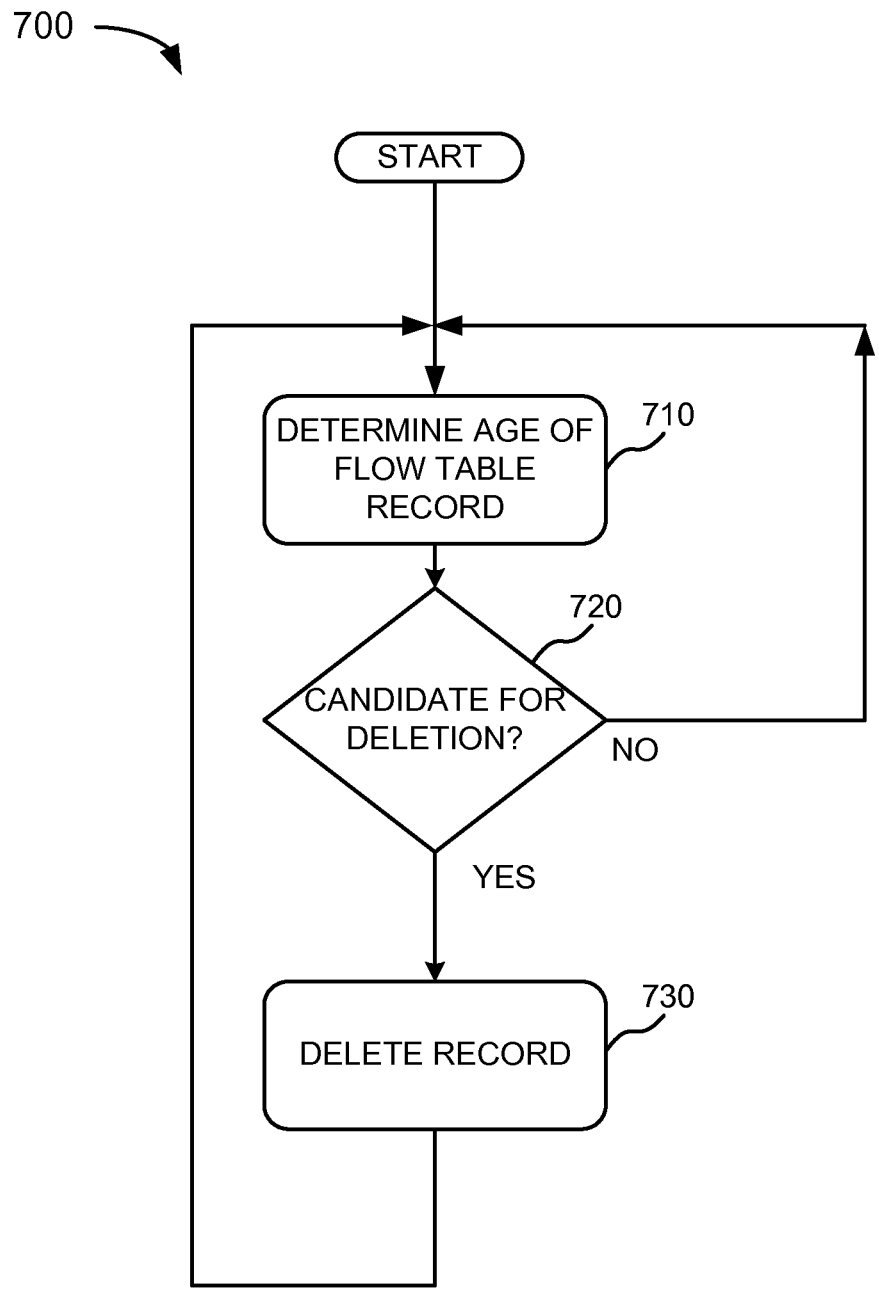
FIG. 7 illustrates a flowchart of an exemplary process for deleting records in the flow table of FIG. 4.

FIG. 7 shows an exemplary flow table record deletion process 700. Process 700 may begin by determining the age of a flow table record (block 710). For example, a flow table record (as shown in FIG. 5B) may include a count value, as stored in timing field 585, which indicates whether a data unit was received in the data flow during a time period during which the count value decremented from a particular value to zero. This count value may identify the age of the flow record in flow table 440 (block 710). Alternatively, a flow table record (as shown in FIG. 5B) may include a time stamp value, as stored in timing field 585, which may indicate when the record was last updated. Aging logic 450 may compare a current time to the time stamp value stored in field 585 to determine a time difference. This time difference may identify the age of the flow record in flow table 440 (block 710).

After determining the age of the record in flow table 440, it is determined whether the record is a candidate for deletion (block 720). In one implementation, aging logic 450 may determine that the record is a candidate for deletion when the count value in timing field 585 is zero. In another implementation, aging logic 450 may compare the threshold time period stored in age field 530 to the age of the flow record, to determine if the age of the record in flow table 440 is greater than the threshold time period. Aging logic 450 may determine that the record is a candidate for deletion when the age is greater than the threshold time period.

In one example, if the count value in timing field 585 is zero, then the record is determined to be a candidate for deletion (Yes—in block 720) and may then be deleted from flow table 440 (block 730). In another example, if the threshold time period is 60 seconds, and if aging logic 450 determines that the age of a record is 90 seconds, the record is determined to be a candidate for deletion (Yes—in block 720)

and may then be deleted from flow table 440 (block 730). After deleting the record from flow table 440, process 700 may return to block 710, where the age of another record in flow table 440 is determined.

In one example, if the count value in timing field 585 is non-zero, then the record is determined not to be a candidate for deletion (No—in block 720) and no action is taken (i.e., the record is not deleted from flow table 440) and process 700 may return to block 710, where the age of another record in flow table 440 is determined. In another example, if, for example, the age of a record in flow table 440 is determined to be less than or equal to the threshold time period (No—in block 720), no action is taken (i.e., the record is not deleted from flow table 440) and process 700 may return to block 710, where the age of another record in flow table 440 is determined. In this manner, different types of data flows may be "aged out" or deleted from flow table 440 based on the type of data flow. In other words, the time period used to "age out" one type of data flow may differ from the time period used to "age out" another type of data flow.

CONCLUSION

Implementations, described herein, may use a flow type table to dynamically manage a flow table which includes information related to information and statistics of a data flow. Using the systems and methods described above, the number of records within a flow table may be efficiently updated and managed. For example, types of data flows, such as those which may be created from a Denial of Service DOS attack, may be masked from the flow table, so as not to overwhelm the quantity of table records. Additionally, specific or different types of data flows may be managed differently from other types of data flows. For example, certain types of data flows may be "aged out" from the flow table more quickly than other types of data flows. Also, certain types of data flows may be sampled differently.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

Also, certain portions of the implementations have been described as "logic" that performs one or more functions. The term "logic," may include hardware, such as a processor, an ASIC, or a FPGA, or a combination of hardware and software (e.g., software running on a processor).

Further, flow and flow type tables have been described. The term "table," as used herein, may refer to any searchable form or arrangement of data within a memory.

Also, while it has been described that the count value in flow table 440 is initially set to the particular value (from flow type table 420) and decremented to zero, the count value could, in another implementation, initially be set to zero and incremented to the particular value (in flow type table 420). This alternative implementation may require additional processing to determine whether a flow table record is "aged out" since the particular value may differ for different types of data flows (rather than making an identical determination, for all data flow types, that a flow table record is aged out when the count value is zero).

It will be apparent that aspects described herein may be implemented in many different forms of software, firmware, and hardware in the implementations illustrated in the figures. The actual software code or specialized control hardware used to implement these aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A network device comprising:
an interface component to:
  receive a data unit associated with a data flow;
  determine a type of the data flow;
  access a flow type table, based on the determined type of the data flow, to determine whether to store first information associated with the data flow in a flow table, the flow type table including second information that indicates whether to store the first information in the flow table;
  process, when the second information indicates that the first information is to be stored in the flow table, the first information to:
    store the first information in the flow table, or
    update a record in the flow table based on the processed first information; and
  process, when the second information indicates that the first information is not to be stored in the flow table, the data unit without storing the first information in the flow table or updating third information in the flow table.

2. The network device of claim 1, where, when determining the type of the data flow, the interface component is further to:
  use information in a header of the received data unit to form a look-up key; and
  identify a flow type identifier based on the formed look-up key.

3. The network device of claim 1, where the interface component is further to:
  determine that the data unit is not associated with a flow type identifier;
  assign, based on determining that the data unit is not associated with the flow type identifier, a default flow type identifier; and
  process the data unit based on the default flow type identifier.

4. The network device of claim 3, where, when processing the data unit based on the default flow type identifier, the interface component is further to:
  access the flow type table to determine how to process the data unit.

5. The network device of claim 1, where, when processing the data unit without storing the first information in the flow table or updating third information in the flow table, the interface component is further to:
  forward the data unit to a switch fabric for transmission to another network device, the other network device being different than the network device.

6. The network device of claim 1, where, when processing the first information to update the record in the flow table based on the processed first information, the interface component is further to:
  determine a quantity of data units in the data flow; and
  update a data unit field in the record of the flow table.

7. The network device of claim 6, where, when updating the data unit field in the record of the flow table, the interface component is further to:
  reset a count value in a field of the flow table based on a value from a field of the flow type table.

8. A method comprising:
  receiving, by a network device, a data unit associated with a data flow;
  determining, by the network device, a type of the data flow;
  accessing, by the network device, a flow type table, based on the determined type of the data flow, to determine whether to store first information associated with the data flow in a flow table, the flow type table including second information that indicates whether to store the first information in the flow table;
  processing, by the network device and when the second information indicates that the first information is to be stored in the flow table, the first information to:
    store the first information in the flow table, or
    update a record in the flow table based on the processed first information; and
  processing, by the network device and when the second information indicates that the first information is not to be stored in the flow table, the data unit without storing the first information in the flow table or updating third information in the flow table.

9. The method of claim 8, where, when determining the type of the data flow, the method further comprises:
  using information in a header of the received data unit to form a look-up key; and
  identifying a flow type identifier based on the formed look-up key.

10. The method of claim 8, where the method further comprises:
  determining that the data unit is not associated with a flow type identifier;
  assigning, based on determining that the data unit is not associated with the flow type identifier, a default flow type identifier; and
  processing the data unit based on the default flow type identifier.

11. The method of claim 10, where, when processing the data unit based on the default flow type identifier, the method further comprises:
  accessing the flow type table to determine how to process the data unit.

12. The method of claim 8, where, when processing the data unit without storing the first information in the flow table or updating third information in the flow table, the method further comprises:
  forwarding the data unit to a switch fabric for transmission to another network device, the other network device being different than the network device.

13. The method of claim 8, where, when processing the first information to update the record in the flow table based on the processed first information, the method further comprises:
  determining a quantity of data units in the data flow; and
  updating a data unit field in the record of the flow table.

14. The method of claim 13, where, when updating the data unit field in the record of the flow table, the method further comprises:
  resetting a count value in a field of the flow table based on a value from a field of the flow type table.

15. A system comprising:
  a device to:
    receive a data unit associated with a data flow;
    determine a type of the data flow;
    access a flow type table, based on the determined type of the data flow, to determine whether to store first information associated with the data flow in a flow table, the flow type table including second information that indicates whether to store the first information in the flow table;
    process, when the second information indicates that the first information is to be stored in the flow table, the first information to:
      store the first information in the flow table, or
      update a record in the flow table based on the processed first information; and
    process, when the second information indicates that the first information is not to be stored in the flow table, the data unit without storing the first information in the flow table or updating third information in the flow table.

16. The system of claim 15, where, when determining the type of the data flow, the device is further to:
  use information in a header of the received data unit to form a look-up key; and
  identify a flow type identifier based on the formed look-up key.

17. The system of claim 16, where, when processing the data unit without storing the first information in the flow table or updating third information in the flow table, the device is further to:
  forward the data unit to a switch fabric for transmission to another device, the other device being different than the device.

18. The system of claim 15, where the device is further to:
  determine that the data unit is not associated with a flow type identifier;
  assign, based on determining that the data unit is not associated with the flow type identifier, a default flow type identifier; and
  process the data unit based on the default flow type identifier.

19. The system of claim 18, where, when processing the data unit based on the default flow type identifier, the device is further to:
  access the flow type table to determine how to process the data unit.

20. The system of claim 15, where, when processing the first information to update the record in the flow table based on the processed first information, the device is further to:
  determine a quantity of data units in the data flow; and
  update a data unit field in the record of the flow table.

* * * * *